United States Patent [19]

Motz

[11] 4,295,980

[45] Oct. 20, 1981

[54] WATERFLOOD METHOD

[75] Inventor: Kaye L. Motz, Ponca City, Okla.

[73] Assignee: Conoco Inc., Ponca City, Okla.

[21] Appl. No.: 103,642

[22] Filed: Dec. 14, 1979

Related U.S. Application Data

[63] Continuation-in-part of Ser. No. 910,243, May 30, 1978, abandoned.

[51] Int. Cl.³ .............................................. E21B 43/22
[52] U.S. Cl. .............................. 252/8.55 D; 166/274; 166/275
[58] Field of Search .................. 252/8.55 D; 166/274, 166/275

[56] References Cited

U.S. PATENT DOCUMENTS

| | | | |
|---|---|---|---|
| 2,174,507 | 6/1938 | Tinker et al. | 252/8.55 X |
| 3,811,505 | 5/1974 | Flournoy et al. | 252/8.55 X |
| 3,811,507 | 5/1974 | Flournoy et al. | 252/8.55 X |
| 3,827,497 | 8/1974 | Dycus et al. | 252/8.55 X |
| 3,865,735 | 2/1975 | Clark et al. | 252/8.55 |
| 3,874,454 | 4/1975 | Clark et al. | 252/8.55 X |
| 4,058,467 | 11/1977 | Sias | 252/8.55 |

*Primary Examiner*—Herbert B. Guynn
*Attorney, Agent, or Firm*—Bayless E. Rutherford, Jr.

[57] ABSTRACT

An improvement is disclosed in the method of recovering hydrocarbons from a subterranean formation by use of an aqueous mixture containing an alkali metal hydrocarbon sulfonate and a solubilizing agent (e.g. isobutanol). Briefly, the improvement comprises using as the sulfonate an alkali metal $C_{20}$–$C_{24}$ alkane sulfonate.

13 Claims, No Drawings

WATERFLOOD METHOD

CROSS-REFERENCE TO RELATED APPLICATIONS

The present application is a continuation-in-part of application Ser. No. 910,243, filed May 30, 1978, now abandoned.

GENERAL BACKGROUND

A large percentage of the oil in petroliferous formations is held within the rock of the formation by the surface forces between the rock, the oil therein, and the aqueous liquid in the formation. As a result, a substantial portion of such oil usually remains in the rock of the formation even when wells traversing the formation are no longer productive. Various secondary techniques, such as thermal recovery, gas injection, and waterflooding have been suggested for the recovery of this fixed oil which remains in the formation after primary recovery methods are no longer feasible to produce additional oil. As a secondary recovery technique, waterflooding is quite commonly employed, and a multiplicity of methods have been suggested for improving the efficiency and economy of oil recovery by the practice of waterflooding. Such methods frequently include incorporation of a water-soluble surfactant in the waterflood liquid, which is injected into the petroliferous formation.

More recently, tertiary recovery methods have been used to recover any oil still remaining after the conclusion of the secondary recovery. There are many such methods. A typical method uses an aqueous surfactant followed by the addition of a polymer solution (such polymers are well-known in the art).

Many types of materials have been suggested as the surfactant for both secondary and tertiary recovery methods. For example many types of sulfonates have been proposed. U.S. Pat. No. 3,302,711 teaches sulfonates derived from a hydrocarbon residue containing 1 to 50 carbon atoms.

I have found that sulfonates prepared from linear alkanes containing from 20 to 24 carbon atoms provide improved results. The results are better than those obtained on a $C_{18}$ alkane sulfonate and much better than that obtained on a $C_{16}$ alkane sulfonate.

Heretofore it has been thought that one property required in a sulfonate for use in surfactant waterflooding was a low interfacial tension between an aqueous surfactant-containing phase and the particular oil. Typically, workers in this field have striven for interfacial tension (IFI) values of $10^{-3}$ dynes/cm. or less. I have found that a surfactant having an IFI of 0.01 to 0.05 dyne/cm. provides excellent results. This is surprising.

My invention is suitable for use in both secondary and tertiary waterflood method which uses a surfactant.

BRIEF SUMMARY OF THE INVENTION

Briefly stated, the present invention is directed to an improvement in the method of recovering hydrocarbons from a petroliferous subterranean formation, said method including the step of injecting into said formation an aqueous saline mixture containing an alkali metal hydrocarbon sulfonate and a solubilizing agent, said improvement comprising injecting into said formation an aqueous saline mixture containing an effective amount of an alkali metal linear alkane sulfonate, wherein the alkane moiety contains 20 to 24 carbon atoms and a solubilizing agent.

DETAILED DESCRIPTION

Suitable alkanes for preparing the sulfonates used in my invention are linear and contain from 20 to 24 carbon atoms. Either individual alkanes or mixtures can be used. A particularly suitable material is a mixture of $C_{20}$, $C_{22}$, and $C_{24}$ alkanes.

While any of the alkali metals can be used to prepare the sulfonate, sodium is preferred because of cost and availability.

Since the preparation of sulfonates from alkanes is well-known in the art it is not considered necessary to include such a description herein.

The amount of alkane sulfonate used can be in the range of about 0.5 to about 25 weight percent of the aqueous mixture used in the waterflooding process. A preferred amount of alkane sulfonate, on the same basis, is in the range of about 1.0 to about 5.0 weight percent.

In addition to the alkane sulfonate the solution to be injected contains a minor, but effective, amount of a solubilizing agent. The primary requisite of the solubilizing agent is that it be soluble in water. Preferred water-soluble solubilizing agents include water-soluble $C_1$-$C_5$ alcohols. Of these alcohols isobutanol and isopropanol are preferred. Examples of other materials which are suitable as solubilizing agents include aryl sulfonates such as sodium benzene sulfonate and sodium xylene sulfonate; sulfonates derived from lower olefins such as butenes and pentenes; alcohol ethoxylates and sulfated derivatives wherein the molecule contains about 30 to 90 weight percent ethylene oxide derived moiety and the alcohol derived component contains about 2 to about 20 carbon atoms; and ethoxylated phenols such as octyl phenol ethoxylates and nonyl phenol ethoxylates.

The amount of solubilizing agent used is in the range of about 1 to about 25 weight percent of the aqueous mixture used in the waterflooding process. A preferred amount of solubilizing agent, on the same basis is about 3 to about 10 weight percent.

The aqueous mixture contains a minor amount of salts of alkali metals. (Otherwise, known as salinity agent.) For example, it can contain NaCl, KCl, $Na_2CO_3$, $K_2CO_3$, $Na_2SO_4$, $K_2SO_4$. The preferred alkali metal is sodium. The amount of these salts of alkali metals is in the range of about 0.5 to about 3.0 weight percent, preferably about 0.75 to about 2.75 weight percent, of the aqueous mixture used in the waterflooding process. Of course, it is to be understood that minor amounts of other materials, which are normally present in the water used for waterflooding operations, can be present in the mixture.

In order to illustrate the nature of the present invention still more clearly the following examples will be given. It is to be understood, however, that the invention is not to be limited to the specific conditions or details set forth in these examples except insofar as such limitations are specified in the appended claims.

EXAMPLE 1

This example is both illustrative and comparative. The example shows the effectiveness of recovering a particular hydrocarbon using the following sulfonates:
$C_{16}$ alkane sulfonate
$C_{18}$ alkane sulfonate $C_{20}$ alkane sulfonate
$C_{22}$ alkane sulfonate
$C_{20-24}$ (mixture) alkane sulfonate
$C_{24-28}$ (mixture) alkane sulfonate The procedure was as follows:

A $1 \times 1 \times 1$ inch core was used. The core sample was evacuated and filled with 1 percent brine solution to determine capacity. An additional 7 ml of brine is pumped through the core. This is followed by 7 ml of Soltrol 170[1], and this is followed by 7 ml of 1 percent sodium chloride solution. Then, 10 ml of the experimental surfactant solution[2] is pumped into the core and this is followed by 10 ml of 1 percent sodium chloride solution.

[1]Soltrol 170 is available from Phillips Petroleum Company, Bartlesville, Okla. It is an odorless petroleum naphtha containing little, if any, unsaturated or aromatic, hydrocarbons. It has a boiling range of 238°–257° C.
[2]The surfactant solution contained 2.5 wt. % of the sulfonate, and 5% isobutanol in water.

The combined surfactant and brine solution obtained after surfactant addition is treated with 5 grams of n-octane. After thorough mixing the phases are separated and the organic layer is dried over sodium sulfate. The quantity of Soltrol 170 present is determined by gas chromatography analysis on an SE-30 column, using the octane as an internal standard.

The results are shown in Table I below.

TABLE I

| Carbon No. of Sulfonate | Residual Oil | Adsorption Eg/g |
|---|---|---|
| $C_{16}$ | 22% | 1.7 |
| $C_{18}$ | 6% | .1 |
| $C_{20}$ | 3.6% | .7 |
| $C_{22}$ | 0 | .1 |
| $C_{20-24}$ | 0 | .7 |
| $C_{24-28}$ | 0 | 1.5 |

EXAMPLE 2

This example illustrates the effectiveness of a $C_{20-24}$ (mixture) alkane sulfonate in recovery crude oil under a variety of conditions. It also shows that $C_{20-24}$ (mixture) alkane sulfonate gives better results than the $C_{24-28}$ (mixture) alkane sulfonate. Further, it shows that the $C_{20-24}$ sulfonate gives good recovery in a system having 2.5% salinity.

In all cases the crude was Big Muddy. This crude comes from the Big Muddy reservoir in Converse County, Wyo.

The procedure was as follows:

Berea sandstone cores, $1 \times 1 \times 12$ inch, were used. They were covered with epoxy and fitted with a header on each end. The cores were mounted in a pressure-temperature bomb which was maintained at 300 psig and 46° C. The cores were evacuated with a vacuum pump and then saturated with 5 weight percent NaCl brine to determine pore volume. Each core was then reduced to irreducible water saturation by flooding with Big Muddy crude oil. The core was then water-flooded with brine to residual oil saturation. The water flood additives (water, NaCl, isobutyl alcohol and alkane sulfonate) were then injected into the core at a rate corresponding to 1 to 2 feet per day.

The quantity of Big Muddy oil produced from the cores was determined by two methods. (1) The total effluent volume was subjected to a Dean-Stark extraction to give the volume of oil removed from the core. (2) The flooded-out core was extracted with toluene to determine the volume of oil remaining in the core. Both methods serve as a check on one another.

The slug size in all cases was 16.7%. The amount of isobutyl alcohol was 4.1 weight percent in all cases. The other variables and results are shown in Table II below.

TABLE II

| Carbon No. of Sulfonate | Active Wt. % | Salinity | Residual Oil % PV | Flow Rate Ft/Day |
|---|---|---|---|---|
| $C_{20-24}$ | 3.0 | .4 | 20.6 | 2 |
| $C_{20-24}$ | 3.0 | 1.0 | 7.2 | 2 |
| $C_{20-24}$ | 3.0 | 1.5 | 5.3 | 2 |
| $C_{20-24}$ | 3.0 | 1.5 | 6.5 | 2 |
| $C_{24-28}$ | 3.0 | 1.5 | 30.2 | 1 |
| $C_{20-24}$ | 3.0 | 2.1 | 11.4 | 1 |
| $C_{20-24}$ | 3.0 | 2.5 | 14.0 | 1 |
| $C_{20-24}$ | 2.6 | 2.5 | 17.2 | 1 |
| $C_{20-24}$ | 3.0 | .4 | 19.1 | 1 |

The interfacial tensions on the above-identified ranged between 0.01 and 0.05 dyne/cm.

Thus, having described the invention in detail, it will be understood by those skilled in the art that certain variations and modifications may be made without departing from the spirit and scope of the invention as defined herein and in the appended claims.

I claim:

1. An improvement in the method of recovering hydrocarbons from a petroliferous subterranean formation, said method including the step of injecting into said formation an aqueous saline mixture containing an alkali metal hydrocarbon sulfonate and a solubilizing agent, said improvement comprising injecting into said formation an aqueous saline mixture containing an effective amount of
    (a) about 0.5 to about 25 weight percent of an alkali metal linear alkane sulfonate wherein the alkane moiety contains 20 to 24 carbon atoms,
    (b) about 1 to about 25 weight percent of a water-soluble solubilizing agent, and
    (c) about 0.5 to about 3 weight percent of a salinity agent which is an alkali metal salt,
    said method being characterized further in that the water-soluble solubilizing agent is a water-soluble $C_1$–$C_5$ alcohol.

2. The method of claim 1 wherein the alkali metal is sodium.

3. The method of claim 2 wherein the sodium alkane sulfonate comprises a mixture of sulfonates containing 20, 22, and 24 carbon atoms in the alkane moiety.

4. The method of claim 3 wherein the salinity agent is sodium chloride.

5. The method of claim 4 wherein the solubilizing agent is isobutanol.

6. The method of claim 4 wherein the solubilizing agent is isopropanol.

7. The method of claim 1 wherein:
    (a) the amount of alkali metal linear alkane sulfonate is about 1 to about 5 weight percent,
    (b) the amount of water-soluble solubilizing agent is about 3 to about 10 weight percent, and
    (c) the amount of salinity agent is about 0.75 to about 2.75 weight percent.

8. The method of claim 7 wherein the alkali metal is sodium.

9. The method of claim 8 wherein the sodium alkane sulfonate comprises a mixture of sulfonates containing 20, 22, and 24 carbon atoms in the alkane moiety.

10. The method of claim 9 wherein the salinity agent is sodium chloride.

11. The method of claim 10 wherein the solubilizing agent is isobutanol.

12. The method of claim 10 wherein the solubilizing agent is isopropanol.

13. The method of claim 7 wherein there is used:
(a) 3.0 weight percent of sodium alkane sulfonates which comprises a mixture of sulfonates containing 20, 22, and 24 carbon atoms in the alkane moiety,
(b) 4.1 weight percent isobutanol, and
(c) 1.5 weight percent sodium chloride.

* * * * *